July 17, 1962 S. E. KEAGLE 3,044,588
SPEED CONTROL FOR AUTOMOTIVE VEHICLES
Filed Dec. 7, 1959 2 Sheets-Sheet 2
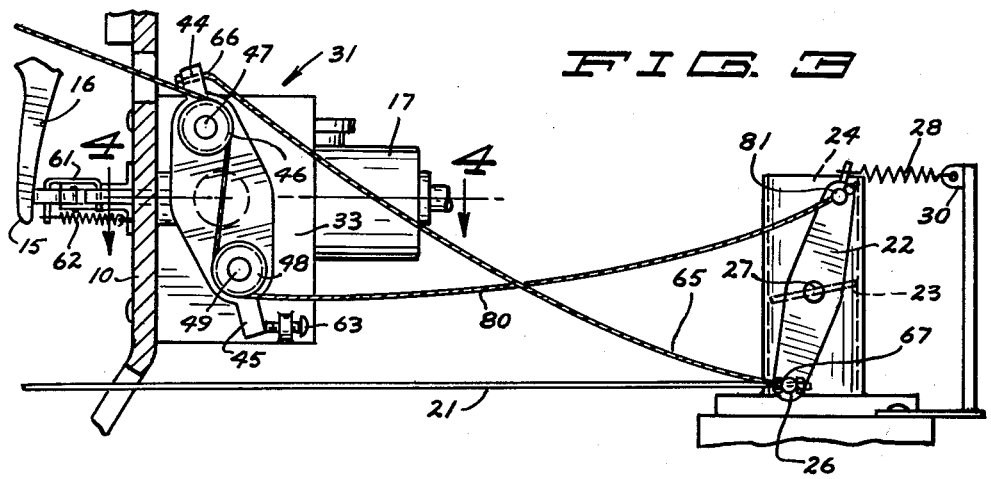
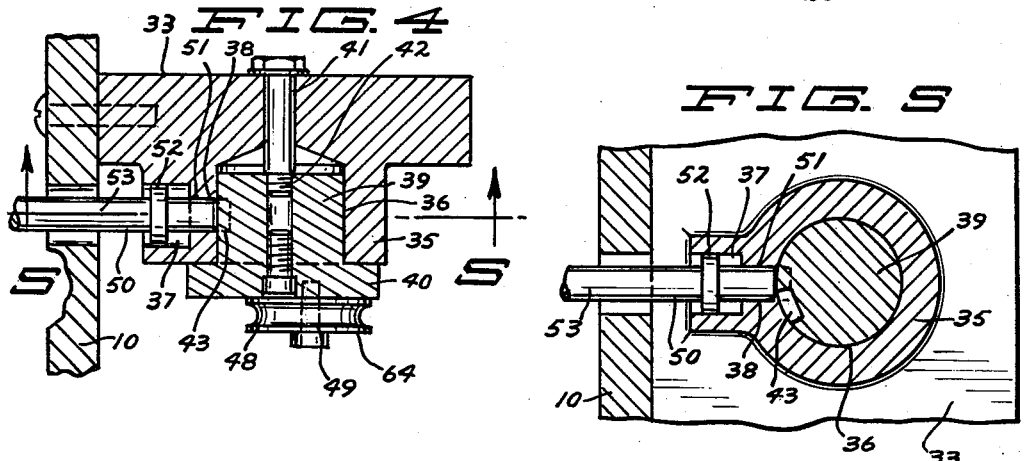
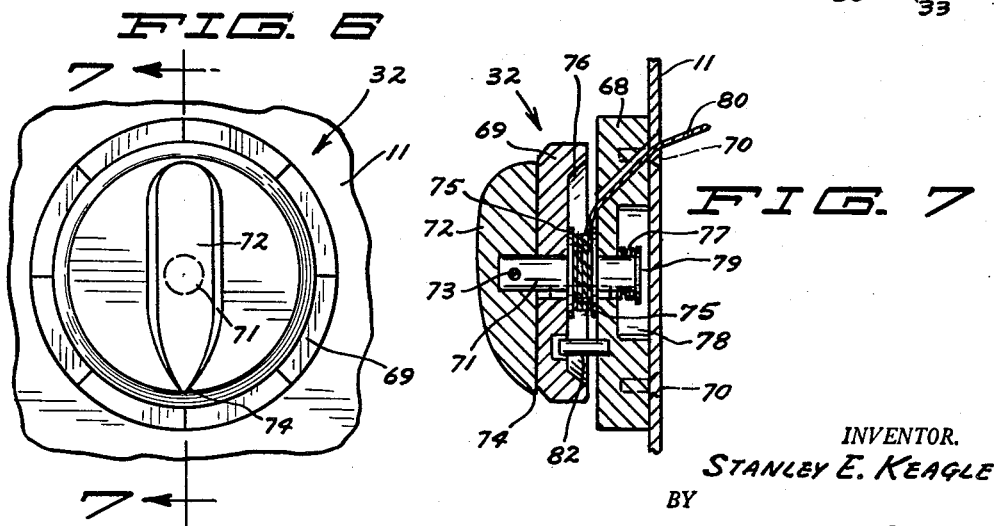
INVENTOR.
STANLEY E. KEAGLE
BY
Braddock and Braddock
ATTORNEYS United States Patent Office 3,044,588
Patented July 17, 1962

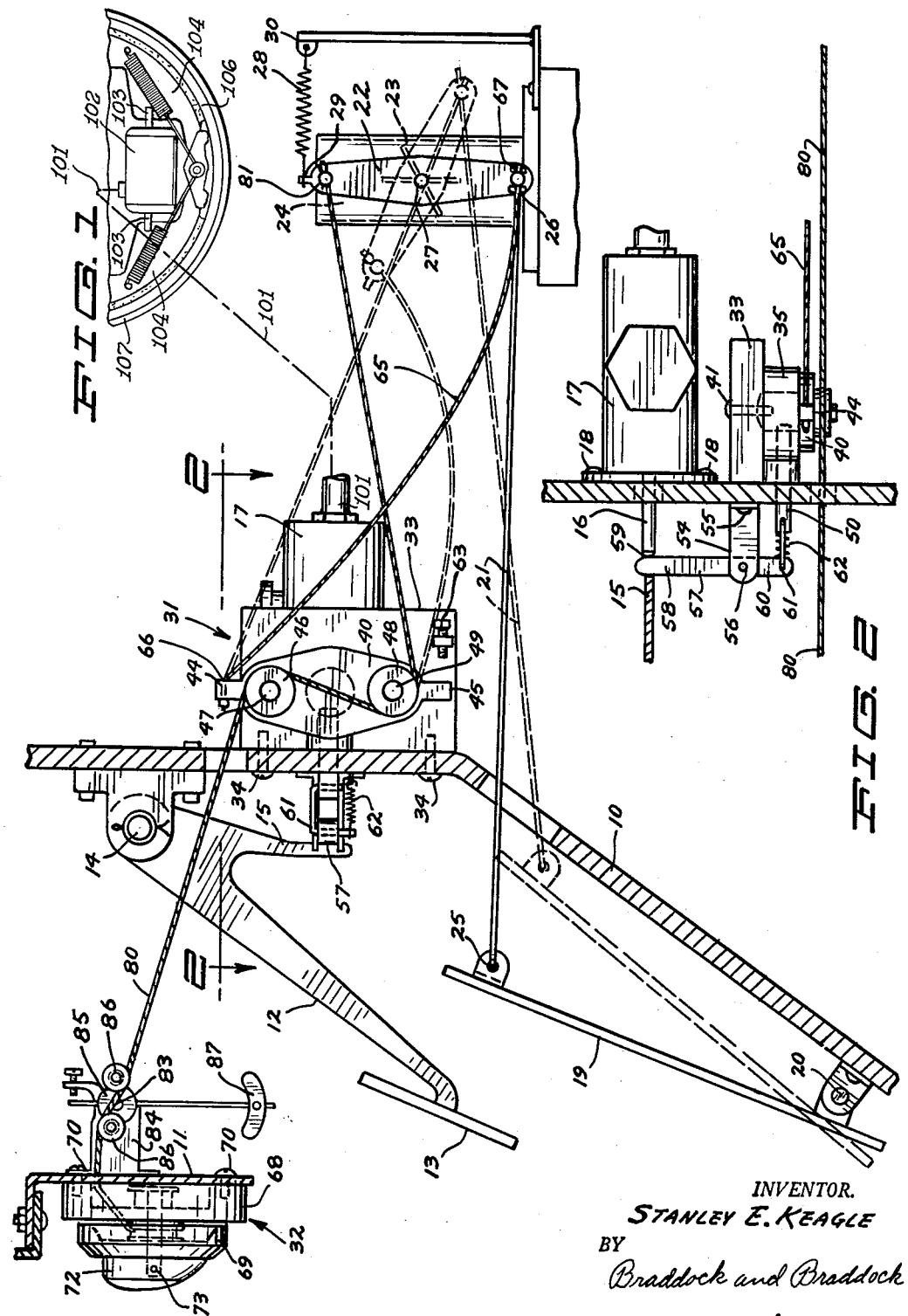

3,044,588
SPEED CONTROL FOR AUTOMOTIVE VEHICLES
Stanley E. Keagle, 2626 Nassau St., Sarasota, Fla.
Filed Dec. 7, 1959, Ser. No. 857,947
15 Claims. (Cl. 192—3)

The invention herein has relation to a speed control for automotive vehicles manipulatable to set the intake valve of the carburetor of the automotive vehicle at and maintain it in any partially open position, between idling and wide open positions, which may be predeterminately selected to provide a passageway at said carburetor of greater or less magnitude, as the case may be, to be resultant in the establishment and maintenance of any of different substantially constant faster or slower cruising speeds which may be preferred during the course of automotive vehicle travel, and also manipulatable, as through the instrumentality of a brake pedal of the automotive vehicle, to be made inoperative thus to release said intake valve and render it capable of being regulated and controlled independently of the speed control.

In the accompanying drawings forming a part of this specification,

FIG. 1 is a more or less diagrammatic view of a speed control for automotive vehicles made according to the invention;

FIG. 2 is a sectional view, on a reduced scale, taken on line 2—2 in FIG. 1;

FIG. 3 is a view corresponding generally with a portion of the disclosure of FIG. 1 disclosing parts of the speed control in different positions;

FIG. 4 is an enlarged sectional view, taken on line 4—4 in FIG. 3;

FIG. 5 is a sectional view, taken as on line 5—5 in FIG. 4;

FIG. 6 is a front elevational view of a housing for an actuator means of the speed control and a manipulating handle with pointer for said actuator means disposed rearwardly of the housing; and FIG. 7 is a sectional view, taken on line 7—7 in FIG. 6.

In the drawings, 10 denotes a so-called fire wall for separating passenger space from space under the hood of an automotive vehicle, and 11 denotes a dash at the rear of said fire wall.

A brake lever 12 with foot piece 13, rotatably supported, as at 14, on the fire wall, is to be situated within the passenger space, and an actuator arm 15 integral with the brake lever is for forcing a brake rod 16 forwardly when braking pressure is to be applied. In the disclosure as made the brake rod is to be operative within a master cylinder 17, suitably and conveniently supported, as at 18, on the fire wall. A brake line 101 opens from master cylinder 17 to slave cylinders such as 102 which has pistons and rods 103, 103 associated therewith which pistons and rods are operative upon transmission of fluid pressure through line 101 to cylinder 102 to cause brakes 104, 104 to be forced outwardly against brake drum 106 to slow rotation of wheel 107 to thus retard the progress of the automotive vehicle. While the brake system shown is hydraulic, the brake rod 16 could be employed in connection with so-called mechanical brakes.

An accelerator pedal 19, rotatably mounted, as at 20, on the fire wall is at a side of the brake lever 12 and an actuator rod 21, of ordinary or preferred construction, suitably and conveniently interconnects the accelerator pedal with a lower arm of a customary actuator lever 22 for an intake valve 23 within a passageway 24 of a carburetor (not shown). More explicitly stated, the rearward end of the actuator rod 21 is pivotally connected, as at 25, to an upper portion of the accelerator pedal 19, and the forward end of said actuator rod is pivotally connected, as at 26, to the lower end of said lower arm of said actuator lever. An intermediate portion of the actuator lever 22 is rigid with a cross pin 27 fixedly supporting the intake valve 23, and a tension coil spring 28, attached at 29 to the upper end of an upper arm of said actuator lever and at 30 to a fixed part, is for normally retaining said intake valve at idling speed position. The intake valve is to be moved progressively toward wide open position, against force of said tension coil spring, in response to depression of the accelerator pedal 19, and the tension coil spring is to be operative upon release of said accelerator pedal to progressively move said intake valve back to normal position.

The speed control includes as parts thereof first and second structures, denoted 31 and 32, respectively, the former being supported on the fire wall 10 and the latter being supported on the dash 11 in the disclosure as made.

A rectilinear slab 33 of the first structure 31 includes a vertical rearward edge surface fitted up against the forward surface of the fire wall and secured thereto by screw bolts 34 which pass through said fire wall and enter threaded apertures in said rectilinear slab. Stated differently, the rectilinear slab 33 is secured to the fire wall to situate the width thereof in a vertical plane in perpendicular relation to said fire wall and disposed longitudinally of the automotive vehicle.

A hollow element 35, integral with and perpendicular to the rectilinear slab 33, bounds or defines an internal cylindrical bearing surface 36, closed at its interior end by a midportion of said rectilinear slab and open at its exterior end, in perpendicular relation to the rectilinear slab and in a horizontal plane. An exterior portion 37 of a radial opening through the hollow element 35 is bounded by an internal surface of relatively large diameter and an interior portion 38 of said radial opening is bounded by an internal surface of comparatively small diameter. The radial opening, composed as the exterior and interior portions 37 and 38, is contiguous at its exterior and interior ends with the external surface and the internal cylindrical bearing surface, respectively, of said hollow element, as well as in spaced relation to both the rectilinear slab and the open end of the hollow element.

An operable unit of the first structure 31 includes a hub 39, rotatably fitted to the internal cylindrical surface 36 bounded or defined by the hollow element 35, and an elongated plate 40 perpendicular to and having a central portion thereof integrally secured to said hub. A stub shaft 41, extending through the rectilinear slab 33 and entering an axial aperture 42 in the hub 39, mounts said hub for movement of rotation, and a socket 43 in the peripheral surface of the hub is selectively to be alined and situated out of alinement with the portions 37 and 38 of the radial opening through the hollow element 35. The elongated plate 40 of the operable unit will be disposed exteriorly of and contiguous with the open end of the hollow element 35, as in FIG. 4 of the drawings, when said unit is assembled with the rectilinear slab 33 and the hollow element 35 in the manner as set forth, with the socket 43 situated to be capable of becoming alined with the radial opening 37, 38 in response to rotation of the hub 39.

The elongated plate 40 includes upper and lower portions which are, respectively, above and below the hub 39 and of equal length in the disclosure as made, and upper and lower lugs integral with upper and lower ends of said elongated plate are indicated 44 and 45, respectively. A first cable 65, extending between the upper lug 44 and the lower end of the actuator lever 22, has its rearward end connected, at 66, to said upper lug and its forward end connected, at 67, to said actuator lever. An adjustable stop 63 on the rectilinear slab 33, engageable by said lower lug 45, is for limiting the extent of rotational movement of the elongated plate 40 in counter-clockwise direction.

An upper pulley 46 is rotatably supported, at 47, on a central upper portion of the external surface of the elongated plate in spaced relation to and above the axis of the hub 39, and a lower pulley 48 is rotatably supported, at 49, on a central lower portion of the external surface of said elongated plate in spaced relation to and below the axis of said hub. The upper and lower pulleys 46 and 48 are in alinement longitudinally of the elongated plate 40 and in parallel, contiguous relation to the external surface of said elongated plate itself situated in a vertical plane disposed longitudinally of the automotive vehicle. The peripheral surface 64 of each pulley is of concave configuration.

A latching pin 50 of the first structure 31 includes an interior end portion of reduced diameter snugly slidably mounted, at 51, in the interior portion 38 of the radial opening through the hollow element 35 and an intermediate portion of larger diameter snugly slidably mounted, at 52, in the exterior portion 37 of said radial opening. A length 53 of said latching pin, at the rear of said intermediate portion of larger diameter, extends to position rearwardly of and is to be longitudinally slidable in an aperture through the fire wall.

A bracket arm 54 rigid, as at 55, with the rearward surface of said fire wall rotatably supports, as at 56, an intermediate portion of a transverse lever 57 spaced rearwardly of the fire wall. A longer end portion 58 of the transverse lever is operatively assembled, as at 59, with the brake rod 16 actuated by the actuator arm 15 of the brake lever 12, a shorter end portion 60 of said transverse lever is pivotally connected, as at 61, to the rearward end of the length 53 of the latching pin 50, and a tension coil spring 62, having one of its ends connected to the adjacent extremity of the transverse lever 57 and its other end connected to the fire wall, normally resiliently urges said latching pin interiorly of the radial slot 37, 38 thus to cause the inner end of the latching pin to be capable of entering the socket 43 in the periphery of the hub 39 in any instance when said socket should become longitudinally alined with said latching pin and radial slot.

A housing of the second structure 32, for actuator means of the speed control, consists of first and second discs, indicated 68 and 69, respectively, the former being secured, as at 70, on the adjacent surface of the dash 11 and the latter being in longitudinal alinement with the former at the side thereof opposite the fire wall.

The actuator means of said second structure includes a shaft 71, extending centrally and perpendicularly through and rotatably mounted in said discs 68 and 69, and a manipulating handle 72 is fixed, as at 73, on the rearward end of said shaft. A pointer of or on said manipulating handle is denoted 74.

An intermediate portion of the shaft 71 slidably supports a spool of said actuator means, consisting of a tubular body and spaced, annular elements, each indicated 75, situated in a concavity 76 in the forward surface of the second disc 69 in contiguous relation to the rearward surface of the first disc 68. The spool is splined to said shaft. A forward intermediate surface of said second disc and said rearward surface of said first disc are retained in resilient pressing engagement against the forward and rearward surfaces, respectively, of the annular elements 75 of the spool through the medium of a compression coil spring 77 on the shaft 71 and in a concavity 78 in the forward surface of the first disc 68 having its rearward end engaged against a forward intermediate surface of the first disc and its rearward end engaged against a collar 79 in the concavity 78 and fixed on the forward end of said shaft. The resilient pressure exerted against the forward and rearward surfaces of the annular elements 75 of the spool provides friction rendering said spool less easily rotatable than it otherwise would be. The construction and arrangement desirably may be such that the compression coil spring 77, in addition to causing the spool to be retained under resilient pressure between the first and second discs 68 and 69, also will resiliently retain the forward surface of the manipulating handle 72 up against the rearward surface of the second disc 68, all as disclosed in FIG. 7 of the drawings. The forward marginal edge of the second disc 69 will be in spaced relation to the rearward surface of the first disc 68 when the second structure 32 is in operation, and said first and second discs will be held against relative turning movement by a pin 82 fixed to one of the discs and snugly slidably entering an aperture in the other disc.

A second cable 80, having its rearward end secured to the tubular body of the spool between the annular elements 75 thereof, is windable on said spool and extends therefrom, by way of an aperture through the first disc 68 and the dash 11, first to pass forwardly and downwardly over and be ridable on upper and forward portions of the perimeter of the upper pulley 46 and thence to pass downwardly and forwardly over and be ridable on rearward and lower portions of the perimeter of the lower pulley 48. The forward end of said second cable is secured, as at 81, to the upper end of the actuator lever 22.

The operable unit, including the hub 39 and the elongated plate 40, of the speed control will be situated as in FIGS. 3, 4 and 5 of the drawings when speed of travel of the automotive vehicle is to be controlled and regulated in usual manner by cooperative manipulation of the accelerator and brake pedals. In said FIG. 3, the operable unit is shown in position as when rotated in counter-clockwise direction several degrees from vertical position, the first cable 65 being somewhat slack, as is also the portion of the second cable 80 to the right of said operable unit, and the socket 43 being below the elevation of and out of alinement with the radial opening 37, 38, as it is disclosed in said FIGS. 4 and 5. The construction and arrangement will be such that said cables 65 and 80 will offer no interference to normal operation of the accelerator pedal 19 and the tension coil spring 28 when the operating unit is situated as in FIG. 3.

The construction and arrangement also will be such that depression of said accelerator pedal to the floor board of the fire wall; that is, to forward position beyond that to which the accelerator pedal is to be pushed during normal operation; will cause the operable unit of the first structure 31 of the speed control to be rotated clockwise from the position as in FIG. 3 to the position as in FIG. 1 of the drawings. Stated differently, normal depression of the accelerator pedal 19 to greater or less extent is but to remove, or have tendency toward removing, slack from the first cable 65, and abnormal depression of said accelerator pedal, to position where closer to the floor board, beyond the position of maximum normal position, is to cause said operable unit to be rotated clockwise, through the instrumentality of the actuator rod 21 and the first cable 65, against action of the tension coil spring 28, to vertical position, as in FIG. 1, thus to aline the socket 43 in the hub 39 with the radial opening 37, 38.

Supposing the speed control of the invention to be inoperative, with the hub 39 and the elongated plate 40 of the operable unit of the first structure 31 situated as in FIG. 3 of the drawings, the accelerator pedal 19 will be depressed to position beyond that of maximum normal operating position, thus to aline the socket 43 in the perimeter of said hub with the latch pin 50, when it is desired to render said speed control operative. Immediately upon alinement of said latch pin and socket, the latch pin will be pushed into the socket by reason of force exerted by the tension coil spring 62, and upon the latching of said operable unit in the position as in FIG. 1 the accelerator pedal will be released.

Supposing the hub 39 and the elongated plate 40 of the operating unit of said first structure 31 of the speed control to be in the latched position as in FIG. 1, the intake valve 23 is to be set in the open position intended to be resultant in the establishment and maintenance of any higher or lower desired speed merely by forcible manual rotation of the spool, by employment of the manipulating handle 72, against resilient frictional resistance exerted against turning movement of said spool. The construction and arrangement will be such that manual force required to turn the spool will be of greater magnitude than the force exerted by the tension coil spring 28. The spool will be manually rotated against resilient frictional force exerted by the compression coil spring 77 and the force of said tension coil spring 28 to cause the second cable 80 to be wound thereon when the intake valve is to be swung toward open position, and forcible winding rotation of said spool will cause said second cable to slide over the pulleys 46 and 48. The spool also will be manually forcibly rotated to cause said second cable to be unwound therefrom when said intake valve is to be permitted to be moved toward closed position by reason of force exerted by the tension coil spring 28. The portion of the second cable extending forwardly from the spool will be fixed against lengthwise movement in either direction except as this may be accomplished or permitted by manual winding or unwinding of the spool.

Supposing the parts of the speed control to be situated as in FIG. 1 of the drawings and it is desired to cause the operable unit of said speed control to be actuated to inoperative position, all that is necessary is to depress the brake lever thus to cause the brake rod 16 to actuate the transverse lever 57 to withdraw the latch pin 50 from the socket 43 in the hub 39 of said operable unit to permit the tension coil spring 28 to become operative to rotate the elongated plate 40, with appurtenances, from position as in FIG. 1 to position as in FIG. 3. It should be stated that the speed control is to be rendered inoperative in response to a very slight push on the brake pedal, actually in practice of magnitude insufficient to cause a usual brake lamp to become lighted.

Adjustment of the second cable 80, to cause the intake valve 23 to be set at wider open or nearer closed positions, as may be desired, when the new and improved speed control is to be put to use can be accomplished either after or before the operable unit is set in latched position. And, regardless of the open position at which said second cable 80 may be retaining said intake valve during operation of said speed control, rotational movement of the elongated plate 40 in counterclockwise direction from latched position to inoperative position is to increase the overall length of the second cable to extent rendering it sufficiently slack to offer no interference to normal rotative movement of the intake valve under cooperative control of the accelerator pedal 19 and the tension coil spring 28.

The control includes a pendulum device, for maintaining speed constant when traveling both up and down hill, supported, as at 83, on a bracket 84 on the dash 11 for rotative movement in a vertical plane longitudinal of the automotive vehicle. A body 85 of the pendulum device extends forwardly and rearwardly of the pivotal support 83, and forward and rearward sheaves on said body are denoted 86. The second cable 80 passes over the rearward sheave and under the forward sheave in engagement with both, and a pendulum 87 suspends from the pivotal support 83.

The pendulum device may be situated substantially as disclosed in FIG. 1 of the drawings when travel is on level ground. The construction and arrangement will be such that when travel is down hill the pendulum will be swung forwardly by gravity to rotate the body 85 with sheaves 86 in counterclockwise direction thus to permit the tension coil spring 28 to elongate the second cable 80 and move the intake valve toward closed position, and when travel is up hill said pendulum will be swung rearwardly by gravity to rotate said body and sheaves in clockwise direction thus to shorten said second cable and move said intake valve toward open position against force of said tension coil spring.

What is claimed is:

1. A speed control for an automotive vehicle including a cross pin, an intake valve supported on said cross pin to be progressively rotatably movable between idling and wide open positions, an actuator lever rigid with said intake valve including first and second end portions disposed at opposite sides, respectively, of said cross pin and resilient means for normally retaining said intake valve in said idling position secured to said first end portion of said actuator lever, comprising first and second devices cooperatively operable against force of said resilient means to actuate the intake valve to and maintain it in any partially open position, between said idling and wide open position, which may be predeterminately selected, said first device including a rotatably mounted hub, an elongated plate rigid with and including first and second end portions at opposite sides, respectively, of said hub, a first cable having opposite end portions thereof secured to said second end portion of said actuator lever and said first end portion of said elongated plate, respectively, means for rotating said hub with elongated plate as a unit from a normal to an abnormal position and means for retaining the elongated plate in said abnormal position, there being spaced pulleys on the opposite end portions, respectively, of said elongated plate in parallel relation thereto, said second device including a rotatably mounted spool, a second cable having a first end portion thereof wound on said spool, a second end portion thereof secured to the first end portion of said actuator lever and an intermediate portion thereof ridable on said spaced pulleys, means for frictionally retaining said rotatably mounted spool in fixed position against force of said resilient means and a manipulating handle for manually turning the rotatably mounted spool in either direction against frictional force exerted by said last mentioned means, rotation of the elongated plate from normal to abnormal position being adapted to cause the overall length of the portion of the second cable between said spool and said actuator lever to be decreased and rotation of said elongated plate from abnormal to normal position being adapted to permit the overall length of said portion to be increased, and means manipulatable to release the elongated plate from abnormal position thus to render said resilient means capable of rotating said elongated plate to normal position.

2. A speed control for an automotive vehicle including a cross pin, an intake valve supported on said cross pin to be progressively rotatably movable between idling and wide open positions, an actuator lever rigid with said intake valve including first and second end portions disposed at opposite sides, respectively, of said cross pin, resilient means for normally retaining said intake valve in said idling position secured to said first end portion of said actuator lever and a brake for retarding progress of said automotive vehicle, comprising first and second devices cooperatively operable against force of said resilient means to actuate the intake valve to and maintain it in any partially open position, between said idling and wide open positions, which may be predeterminately selected, said first device including a rotatably mounted hub, an elongated plate rigid with and including first and second end portions at opposite sides, respectively, of said hub, a first cable having opposite end portions thereof secured to said second end portion of said actuator lever and said first end portion of said elongated plate, respectively, means for rotating said hub with elongated plate as a unit from a normal to an abnormal position and means for retaining the elongated plate in said abnormal position, there being spaced pulleys on the opposite end portions, respectively, of said elongated plate in parallel relation thereto, said second device including a rotatably mounted spool, a second cable having a first end portion thereof wound on said spool, a second end portion thereof secured to the first end portion of said actuator lever and an intermediate portion thereof ridable on said spaced pulleys, means for frictionally retaining said rotatably mounted spool in fixed position against force of said resilient means and a manipulating handle for manually turning the rotatably mounted spool in either direction against frictional force exerted by said last mentioned means, rotation of the elongated plate from normal to abnormal position being adapted to cause the overall length of the portion of the second cable between said spool and said actuator lever to be decreased and rotation of said elongated plate from abnormal to normal position being adapted to permit the overall length of said portion to be increased, and means including said brake as a part thereof manipulatable to release the elongated plate from abnormal position thus to render said resilient means capable of rotating said elongated plate to normal position.

3. A speed control for an automotive vehicle including a cross pin, an intake valve supported on said cross pin to be progressively rotatably movable between idling and wide open position, an actuator lever rigid with said intake valve including first and second end portions disposed at opposite sides, respectively, of said cross pin, resilient means for normally retaining said intake valve in said idling position secured to said first end portion of said actuator lever and an accelerator pedal for actuating the intake valve toward open position against force of said resilient means, comprising first and second devices cooperatively operable against force of said resilient means to actuate the intake valve to and maintain it in any partially open position, between said idling and wide open positions, which may be predeterminately selected, said first device including a rotatably mounted hub, an elongated plate rigid with and including first and second end portions at opposite sides, respectively, of said hub, a first cable having opposite end portions thereof secured to said second end portion of said actuator lever and said first end portion of said elongated plate, respectively, means including said accelerator pedal as part thereof for rotating said hub with elongated plate as a unit from a normal to an abnormal position and means for retaining the elongated plate in said abnormal position, there being spaced pulleys on the opposite end portions, respectively, of said elongated plate in parallel relation thereto, said second device including a rotatably mounted spool, a second cable having a first end portion thereof wound on said spool, a second end portion thereof secured to the first end portion of said actuator lever and an intermediate portion thereof ridable on said spaced pulleys, means for frictionally retaining said rotatably mounted spool in fixed position against force of said resilient means and a manipulating handle for manually turning the rotatably mounted spool in either direction against frictional force exerted by said last mentioned means, rotation of the elongated plate from normal to abnormal position being adapted to cause the overall length of the portion of the second cable between said spool and said actuator lever to be decreased and rotaiton of said elongated plate from abnormal to normal position being adapted to permit the overall length of said portion to be increased, and means manipulatable to release the elongated plate from abnormal position thus to render said resilient means capable of rotating said elongated plate to normal position.

4. A speed control for an automotive vehicle including a cross pin, an intake valve supported on said cross pin to be progressively rotatably movable between idling and wide open positions, an actuator lever rigid with said intake valve including first and second end portions disposed at opposite sides, respectively, of said cross pin, resilient means for normally retaining said intake valve in said idling position secured to said first end portion of said actuator lever, an accelerator pedal for actuating the intake valve toward open position against force of said resilient means and a brake for retarding progress of said automotive vehicle, comprising first and second devices cooperatively operable against force of said resilient means to actuate the intake valve to and maintain it in any partially open position, between said idling and wide open positions, which may be predeterminately selected, said first device including a rotatably mounted hub, an elongated plate rigid with and including first and second end portions at opposite sides, respectively, of said hub, a first cable having opposite end portions thereof secured to said second end portion of said actuator lever and said first end portion of said elongated plate, respectively, means including said accelerator pedal as part thereof for rotating said hub with elongated plate as a unit from a normal to an abnormal position and means for retaining the elongated plate in said abnormal position, there being spaced pulleys on the opposite end portions, respectively, of said elongated plate in parallel relation thereto, said second device including a rotatably mounted spool, a second cable having a first end portion thereof wound on said spool, a second end portion thereof secured to the first end portion of said actuator lever and an intermediate portion thereof ridable on said spaced pulleys, means for frictionally retaining said rotatably mounted spool in fixed position against force of said resilient means and a manipulating handle for manually turning the rotatably mounted spool in either direction against frictional force exerted by said last mentioned means, rotation of the elongated plate from normal to abnormal position being adapted to cause the overall length of the portion of the second cable between said spool and said actuator lever to be decreased and rotation of said elongated plate from abnormal to normal position being adapted to permit the overall length of said portion to be increased, and means including said brake as part thereof manipulatable to release the elongated plate from abnormal position thus to render said resilient means capable of rotating said elongated plate to normal position.

5. The combination as specified in claim 2 wherein said means for retaining the elongated plate in abnormal position includes a spring pressed locking pin to be insertable in a socket in a peripheral surface of said hub, and said means manipulatable to release the elongated plate from abnormal position includes a lever to be operable in response to actuation of said brake to remove said locking pin from said socket.

6. The combination as specified in claim 4 wherein said means for retaining the elongated plate in abnormal position includes a spring pressed locking pin to be insertable in a socket in a peripheral surface of said hub, and said means manipulatable to release the elongated plate from abnormal position includes a lever to be operable in response to actuation of said brake to remove said locking pin from said socket.

7. The combination as specified in claim 1, and a pendulum device operable to cause said second cable to become effectively shortened in response to up hill travel and to be permitted to become effectively lengthened in response to down hill travel.

8. The combination as specified in claim 4, and means including a pendulum device having sheaves assembled with said second cable for maintaining constant speed when travelling both up and down hill.

9. A speed control for an automotive vehicle including a cross pin, an intake valve supported on said cross pin to be progressively rotatably movable between idling and wide open positions, a pivotally mounted lever operably associated with said intake valve including first and second end portions disposed at opposite sides, respectively, of the point of said pivotal mounting and resilient means for normally retaining said intake valve in said idling position, comprising first and second devices cooperatively operable against force of said resilient means to actuate the intake valve to and maintain it in any partially open position, between said idling and wide open positions, which may be predeterminately selected, said first device including a rotatably mounted hub, an elongated plate rigid with and including first and second end portions at opposite sides, respectively, of said hub, a first cable having opposite end portions thereof secured to said second end portion of said pivotally mounted lever, and said first end portion of said elongated plate, respectively, means for rotating said hub with elongated plate as a unit from a normal to an abnormal position and means for retaining the elongated plate in said abnormal position, there being spaced pulleys on the opposite end portions, respectively, of said elongated plate in parallel relation thereto, said second device including a pivotally mounted member, a second cable having a first end portion thereof fastened to said pivotally mounted member, a second end portion thereof secured to the first end portion of said pivotally mounted lever and an intermediate portion thereof ridable on said spaced pulleys, means for frictionally retaining said pivotally mounted member in fixed position against force of said resilient means and a manipulating handle for manually turning the pivotally mounted member in either direction against frictional force exerted by said last mentioned means, rotation of the elongated plate from normal to abnormal position being adapted to cause the effective overall length of the portion of the second cable between said pivotally mounted member and said pivotally mounted lever to be decreased and rotation of said elongated plate from abnormal to normal position being adapted to permit the effective overall length of said portion to be increased, and means manipulatable to release the elongated plate from abnormal position thus to render said resilient means capable of rotating said elongated plate to normal position.

10. The combination as specified in claim 9, and a pendulum device operable to cause said second cable to become effectively shortened in response to uphill travel and to be permitted to become effectively lengthened in response to downhill travel.

11. A speed control for an automotive vehicle including a cross pin, an intake valve supported on said cross pin to be progressively rotatably movable between idling and wide open positions, an actuator lever pivoted with said intake valve including first and second end portions disposed at opposite sides, respectively, of said cross pin, resilient means for normally retaining said intake valve in said idling position secured to said first end portion of said actuator lever, a brake for retarding progress of said automotive vehicle and a brake pedal for controlling said brake, comprising first and second devices cooperatively operable against force of said resilient means to actuate the intake valve to and maintain it in any partially open position, between said idling and wide open positions, which may be predeterminately selected, said first device including a rotatably mounted hub, an elongated plate rigid with and including first and second end portions at opposite sides, respectively, of said hub, a first cable having opposite end portions thereof secured to said second end portion of said actuator lever and said first end portion of said elongated plate, respectively, means for rotating said hub with elongated plate as a unit from a normal to an abnormal position and means for retaining the elongated plate in said abnormal position, there being spaced pulleys on the opposite end portions, respectively, of said elongated plate in parallel relation thereto, said second device including a pivotally mounted member, a second cable having a first end portion thereof attached to said pivotally mounted member, a second end portion thereof secured to the first end portion of said actuator lever and an intermediate portion thereof ridable on said spaced pulleys, means for frictionally retaining said pivotally mounted member in fixed position against force of said resilient means and a manipulating handle for manually turning the pivotally mounted member in either direction against frictional force exerted by said last mentioned means, rotation of the elongated plate from normal to abnormal position being adapted to cause the overall length of the portion of the second cable between said member and said actuator lever to be decreased and rotation of said elongated plate from abnormal to normal position being adapted to permit the overall length of said portion to be increased, and means including said brake as a part thereof manipulatable to release the elongated plate from abnormal position thus to render said resilient means capable of rotating said elongated plate to normal position.

12. The combination as specified in claim 11 wherein said means for retaining the elongated plate in abnormal position includes a spring pressed locking pin to be insertable in a socket in a peripheral surface of said hub, and said means manipulatable to release the elongated plate from abnormal position includes a lever to be operable in response to actuation of said brake pedal to remove said locking pin from said socket.

13. A speed control for an automotive vehicle including a cross pin, an intake valve supported on said cross pin to be progressively rotatably movable between idling and wide open position, an actuator lever pivoted with said intake valve including first and second end portions disposed at opposite sides, respectively, of said cross pin, resilient means for normally retaining said intake valve in said idling position secured to said first end portion of said actuator lever and an accelerator pedal for actuating the intake valve toward open position against force of said resilient means, comprising first and second devices cooperatively operable against force of said resilient means to actuate the intake valve to and maintain it in any partially open position, between said idling and wide open positions, which may be predeterminately selected, said first device including a rotatably mounted hub, an elongated plate rigid with and including first and second end portions at opposite sides, respectively, of said hub, a first cable having opposite end portions thereof secured to said second end portion of said actuator lever and said first end portion of said elongated plate, respectively, means including said accelerator pedal as part thereof for rotating said hub with elongated plate as a unit from a normal to an abnormal position and means for retaining the elongated plate in said abnormal position, there being spaced pulleys on the opposite end portions, respectively, of said elongated plate in parallel relation thereto, said second device including a pivotally mounted member, a second cable having a first end portion thereof attached to said pivotally mounted member, a second end portion thereof secured to the first end portion of said actuator lever and an intermediate portion thereof ridable on said spaced pulleys, means for frictionally retaining said pivotally mounted member in fixed position against force of said resilient means and a manipulating handle for manually turning the pivotally mounted member in either direction against frictional force exerted by said last mentioned means, rotation of the elongated plate from normal to abnormal position being adapted to cause the overall length of the portion of the second cable between said spool and said actuator lever to to be decreased and rotation of said elongated plate from abnormal to normal position being adapted to permit the overall length of said portion to be increased, and means manipulatable to release the elongated plate from abnormal position thus to render said resilient means capable of rotating said elongated plate to normal position.

14. A speed control for an automotive vehicle including a cross pin, an intake valve supported on said cross pin to be progressively rotatably movable between idling and wide open positions, an actuator lever pivoted with said intake valve including first and second end portions disposed at opposite sides, respectively, of said cross pin, resilient means for normally retaining said intake valve in said idling position secured to said first end portion of said actuator lever, an accelerator pedal for actuating the intake valve toward open position against force of said resilient means and a brake for retarding progress of said automotive vehicle, comprising first and second devices cooperatively operable against force of said resilient means to actuated the intake valve to and maintain it in any partially open position, between said idling and wide open positions, which may be predeterminately selected, said first device including a rotatably mounted hub, an elongated plate rigid with and including first and second end portions at opposite sides, respectively, of said hub, a first cable having opposite end portions thereof secured to said second end portion of said actuator lever and said first end portion of said elongated plate, respectively, means including said accelerator pedal as part thereof for rotating said hub with elongated plate as a unit from a normal to an abnormal position and means for retaining the elongated plate in said abnormal position, there being spaced pulleys on the opposite end portions, respectively, of said elongated plate in parallel relation thereto, said second device including a pivotally mounted member, a second cable having a first end portion thereof attached to said pivotally mounted member, a second end portion thereof secured to the first end portion of said actuator lever and an intermediate portion thereof ridable on said spaced pulleys, means for frictionally retaining said pivotally mounted member in fixed position against the force of said resilient means and a manipulating handle for manually turning the pivotally mounted member in either direction against frictional force exerted by said last mentioned means, rotation of the elongated plate from normal to abnormal position being adapted to cause the overall length of the portion of the second cable between said member and said actuator lever to be decreased and rotation of said elongated plate from abnormal to normal position being adapted to permit the overall length of said portion to be increased, and means including said brake as part thereof manipulatable to release the elongated plate from abnormal position thus to render said resilient means capable of rotating said elongated plate to normal position.

15. The combination as specified in claim 14, and means including a pendulum device having sheaves assembled with said second cable for maintaining constant speed when traveling both up and downhill.

References Cited in the file of this patent
UNITED STATES PATENTS

| | | |
|---|---|---|
| 1,861,018 | Lange | May 31, 1932 |
| 2,609,074 | Leihgeber | Sept. 2, 1952 |
| 2,799,373 | Wagner | July 16, 1957 |